(12) United States Patent
Wright et al.

(10) Patent No.: US 9,424,295 B2
(45) Date of Patent: Aug. 23, 2016

(54) SYSTEMS AND METHODS FOR TABLES OF CONTENTS

(71) Applicant: Thomson Reuters Global Resources, Baar (CH)

(72) Inventors: Justin Wright, Rosemount, MN (US); David Hendricksen, Eagan, MN (US); Darla Renae Agard, Eagan, MN (US)

(73) Assignee: Thomson Reuters Global Resources, Baar (CH)

( * ) Notice: Subject to any disclaimer, the term of this patent is extended or adjusted under 35 U.S.C. 154(b) by 316 days.

(21) Appl. No.: 14/094,468

(22) Filed: Dec. 2, 2013

(65) Prior Publication Data

US 2014/0089350 A1    Mar. 27, 2014

Related U.S. Application Data

(63) Continuation of application No. 12/415,909, filed on Mar. 31, 2009, now Pat. No. 8,600,942.

(60) Provisional application No. 61/072,577, filed on Mar. 31, 2008.

(51) Int. Cl.
  *G06F 17/00*   (2006.01)
  *G06F 17/30*   (2006.01)

(52) U.S. Cl.
  CPC .... *G06F 17/30327* (2013.01); *G06F 17/30011* (2013.01); *G06F 17/30722* (2013.01)

(58) Field of Classification Search
  None
  See application file for complete search history.

(56) References Cited

U.S. PATENT DOCUMENTS

| | | | | |
|---|---|---|---|---|
| 6,185,569 B1* | 2/2001 | East | ................. | G06F 17/30958 707/E17.011 |
| 6,199,098 B1* | 3/2001 | Jones | ................ | G06F 17/30882 707/E17.013 |
| 8,296,682 B2* | 10/2012 | Sloo | .................. | G06F 17/30126 715/853 |
| 2002/0133497 A1* | 9/2002 | Draper | ................ | G06F 17/2205 707/E17.032 |
| 2003/0135520 A1* | 7/2003 | Mitchell | ........... | G06F 17/30309 707/E17.005 |
| 2004/0093323 A1* | 5/2004 | Bluhm | .............. | G06F 17/30011 707/E17.008 |
| 2005/0091283 A1* | 4/2005 | Debique | ........... | G06F 17/30038 707/E17.009 |
| 2005/0149343 A1 | 7/2005 | Rhoads et al. | | |
| 2005/0204385 A1* | 9/2005 | Sull | ................... | G06F 17/30817 725/45 |

(Continued)

*Primary Examiner* — Hua Lu

(57) ABSTRACT

To address problems related to use and formation of tables of contents, the present inventors, devised among other things, an exemplary table-of-contents (TOC) data structure and related systems and methods. One exemplary method entails associating a node from one TOC with a node of another TOC and then assigning a unique identifier to the associated pair of nodes. The unique identifier can then be used to logically define another TOC that includes portions of the two original Tics. Another exemplary method entails tagging or associating nodes of a TOC with one or more view labels. (Identifiers for node relationships rather than the nodes themselves are tagged with the labels in some embodiments.)

20 Claims, 4 Drawing Sheets

(56) References Cited

U.S. PATENT DOCUMENTS

| | | | | |
|---|---|---|---|---|
| 2006/0047646 A1* | 3/2006 | Maluf | G06F 17/30932 | 707/E17.13 |
| 2006/0056334 A1* | 3/2006 | Yuan | G06F 17/30905 | 370/328 |
| 2006/0184566 A1* | 8/2006 | Lo | G06F 17/30038 | 707/E17.009 |
| 2006/0225001 A1* | 10/2006 | Sylthe | G06F 17/30899 | 715/864 |
| 2007/0027897 A1* | 2/2007 | Bremer | G06F 17/30643 | 707/E17.067 |
| 2007/0038930 A1* | 2/2007 | Derrick | G06F 17/2247 | 715/236 |
| 2008/0270450 A1* | 10/2008 | Veitch | G06F 17/301 | 707/999.005 |
| 2009/0013281 A1* | 1/2009 | Helfman | G06F 17/30572 | 715/788 |
| 2009/0187579 A1* | 7/2009 | Brancaccio | G06F 17/30545 | 707/999.01 |
| 2010/0115001 A1* | 5/2010 | Soules | G06F 17/301 | 707/821 |
| 2010/0115003 A1 | 5/2010 | Soules et al. | | |
| 2010/0169354 A1* | 7/2010 | Baby | G06F 17/30911 | 707/765 |
| 2010/0174778 A1* | 7/2010 | Yuan | G01R 31/31705 | 709/203 |
| 2010/0174975 A1* | 7/2010 | Mansfield | G06F 17/211 | 715/227 |
| 2011/0002333 A1* | 1/2011 | Karuppiah | H04L 12/1836 | 370/390 |

* cited by examiner

SYSTEMS AND METHODS FOR TABLES OF CONTENTS

RELATED APPLICATIONS

This application is a continuation of U.S. patent application Ser. No. 12/415,909, filed on Mar. 31, 2009, which issued as U.S. Pat. No. 8,600,942, which claims priority to U.S. Provisional Patent Application 61/072,577, which was filed on Mar. 31, 2008, all of which are incorporated herein by reference in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2008, Thomson Global Resources.

TECHNICAL FIELD

Various embodiments of the present invention concern representation and usage of object relational trees, such as tables of contents, in large document repositories and online research services.

BACKGROUND

The Westlaw research system is a popular online service that provides lawyers and other professionals a highly effective way to research legal, financial, business, and news information, for example. The system, vast in its scope, includes thousands of specialized databases. In many instances, the databases include topical collections of documents that are associated with tables of content (TOCs) or hierarchical tree-like data structures, which facilitate navigation and browsing of the document collections.

The present inventors have recognized one or more problems with this conventional way of organizing content along topical lines using TOCs. For example, one problem is that users often have a desire for content that spans across two or more topical collections, and thus two or more corresponding TOCs. Yet, the TOCs are organized and accessed separately from each other, leaving users the chore of navigating separate TOCs to find the information they need. It is possible to build a new TOC that combines the two or more TOCs; however, this is time-consuming and inefficient, when one considers the number of combined topics that would be desirable for users.

Accordingly, the present inventors identified a need for improved ways of using TOCs.

SUMMARY

To address this and/or one or more other needs, the present inventors, devised among other things, an exemplary table-of-contents (TOC) data structure and related systems and methods. One exemplary method entails associating a node from one TOC with a node of another TOC and then assigning a unique identifier to the associated pair of nodes. The unique identifier can then be used to logically define another TOC that includes portions of the two original TOCs. Another exemplary method entails tagging or associating nodes of a TOC with one or more view labels. (Identifiers for node relationships rather than the nodes themselves are tagged with the labels in some embodiments.)

The view labels enable combining multiple topical TOCs together to define new hybrid TOCs and document collections without duplicating the underlying documents. For example, a collection of insurance documents and a collection of tax documents can be selectively combined by tagging various nodes of their respective TOCs with the same view tag or label, enabling all the nodes with the tags and/or their associated documents to be referenced and navigated.

DETAILED DESCRIPTION OF EXEMPLARY EMBODIMENT(S)

Figure 1:
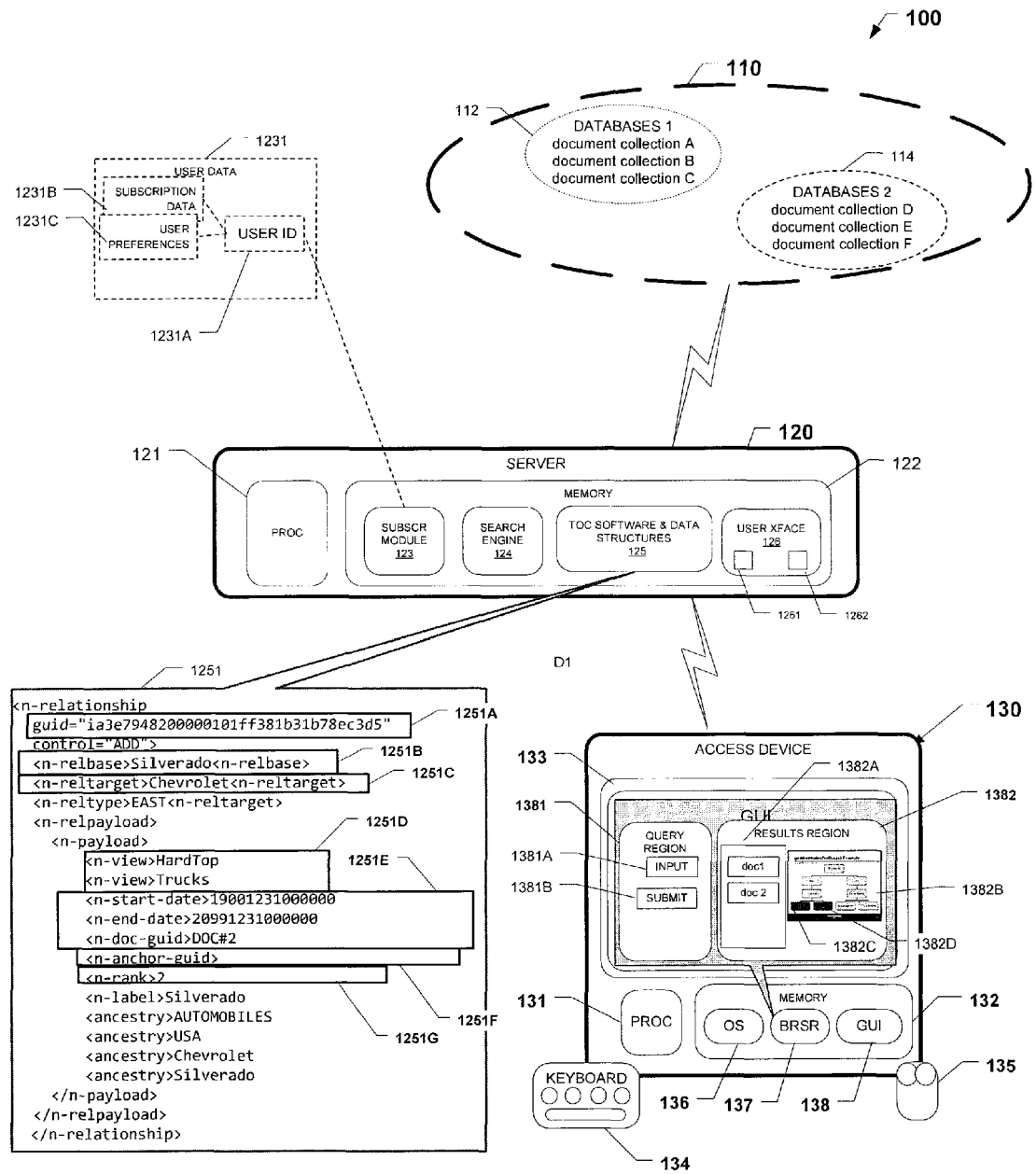
FIG. 1 is a block diagram of an exemplary information-retrieval system 100 which corresponds to one or more embodiments of the present invention.

This document describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

U.S. Pat. No. 7,085,755 is incorporated herein by reference.

Exemplary Definitions

The description includes many terms that are defined by industry usage and/or specific context. As an aid to understanding the exemplary embodiments, the following exemplary definitions are provided:

| Term | Definition |
|---|---|
| Domain | A domain is a logical grouping of collections in which node relationships are stored. While the domain is the entry point for a product to retrieve content, collections within the domain allow Publishing to manage, group and |

-continued

| Term | Definition |
|---|---|
| | load relationships according to logical Publishing processes and functions. A specific collection can belong to and reside in only one domain. |
| Node | A TOC record in the database. The name "node" is derived from the fact that a TOC is a tree data structure, and each record is called a "node" of the tree. |
| Relationship Base | A required identifier for the relationship. Used to retrieve relationships. Corresponds to a "child". |
| Relationship Id | A valid GUID that uniquely identifies each relationship. Each relationship must have a unique Relationship Id GUID. This field has a 33 character maximum. |
| Relationship Target | Corresponds to a "parent". |
| Root Node | A node in the TOC tree that has no parent node (relationship target). |
| Search Summarization | Search feature that allows user to summarize a search result based on a selected summary field. Can be used with TOC to provide a hierarchical summarization when a TOC node GUID is the summary field item (summarization would compute the number of found documents under TOC nodes). Implemented within TOC as a performance improvement over TOC with Hits. |
| Sibling | Child nodes that share a common parent node. |
| Sibling Rank | A numeric value assigned to siblings to provide order to those siblings. |
| TOC | Table of Contents |
| TOC with Hits | The functionality in TOC retrieval that adds search hit information to nodes that are returned in TOC API call result (the "non summarized" way). This is done by passing a SearchResult into the API call. |
| TOC of TOCs | A grouping of multiple TOCs which when viewed individually have individual hierarchies (a subset of the full TOC) but also join together to provide a master TOC. |
| Versioned TOC | TOC content whose nodes are assigned a date range in which they are valid. All API calls that retrieve versioned TOC nodes must specify a date/timestamp to tell Novus which nodes to return. |
| View Property | An element value specified within the Payload which when applied serves as a filtering mechanism to access different slices of content. Also referred to as "view". The resulting structure must be a well defined hierarchical tree containing a single path to a root node. |

Exemplary Information-Retrieval System

FIG. 1 shows an exemplary online information-retrieval (or legal research) system 100. System 100 includes one or more databases 110, one or more servers 120, and one or more access devices 130.

Exemplary Databases

Databases 110 include database sets 112 and 114. Database set 112 includes topical document collections A, B, and C, and database set 114 includes topical document collections D, E, and F. In some embodiments, one or more of the document collections include judicial opinions and statutes from one or more local, state, federal, and/or international jurisdictions. Other embodiments may contain tax, accounting, and/or insurance documents.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Exemplary Server

Server 120, which is generally representative of one or more servers for serving data in the form of webpages or other markup language forms with associated applets, remote-invocation objects, or other related software and data structures to service clients of various "thicknesses." More particularly, server 120 includes a processor module 121, a memory module 122, a subscriber module 123, a search module 124, a table-of-contents (TOC) software and data module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber module 123, search module 124, table-of-contents (TOC) software and data module 125, and user-interface module 126.

Subscriber module 123 includes subscriber-related software and data for controlling, administering, and managing pay-as-you-go or subscription-based access of databases 110. In the exemplary embodiment, subscriber database 123 includes one or more user preference (or more generally user) data structures, of which data structure 1231 is generally representative. In the exemplary embodiment, data structure 1231 includes a user identifier portion 1231A, subscription data portion 1231B, and user preference portion 1231C. User identifier portion 1231A includes a unique user identifier. Subscription data portion 1231B includes administrative, accounting, and/or security related information, such as user-names and passwords, billing information, contact information, etc. User preference information portion 1231C includes one or more aspects of the user data structure relate to user customization of various search and interface options, such as jurisdiction of practice, area of practice, etc. In some embodiments, this portion may include user defined preferences such as most-frequently accessed databases or topical document collections, and even user-defined combinations of document collections.

Search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

TOC software and data module 125 includes machine readable and/or executable instruction sets and data for implementing various TOC related functionality. In the exemplary embodiment, the data includes a set of tables of contents TOCs for topical data collections contained within databases 110. Each TOC itself includes a set of relationship records, of which TOC data structure or record 1251 is generally representative. TOC data structure 1251 includes records which define relationships between nodes within tables of contents or between two separate tables of contents.

More specifically, TOC data structure 1251 includes a relationship guid (global unique ID) portion 1251A, a child (or base) node guid portion 1251B, a target (or parent) node guid portion 1251C, a view label or tag portion 1251D, a date-range portion 1251E, an anchor guid portion 1251F, and a node rank indicator portion 1251G.

Relationship guid portion 1251A includes a unique identifier for a particular parent-child relationship defined by base guid portion 1251B and target guid portion 1251C, which include respective child node and parent node guids. View label portion 1251D includes content, such as a text labels "hardtop" and "trucks" that can be used in filtering views of the hierarchy. Date-range portion 1251E includes a start date and an end date which define an effective temporal window for the associated parent-child relationship. Node rank indicator portion 1251G provides a rank indicator for the associated child node 1251B, which is used in ordering multiple child (sibling) nodes for display or navigation.

Figure 2:
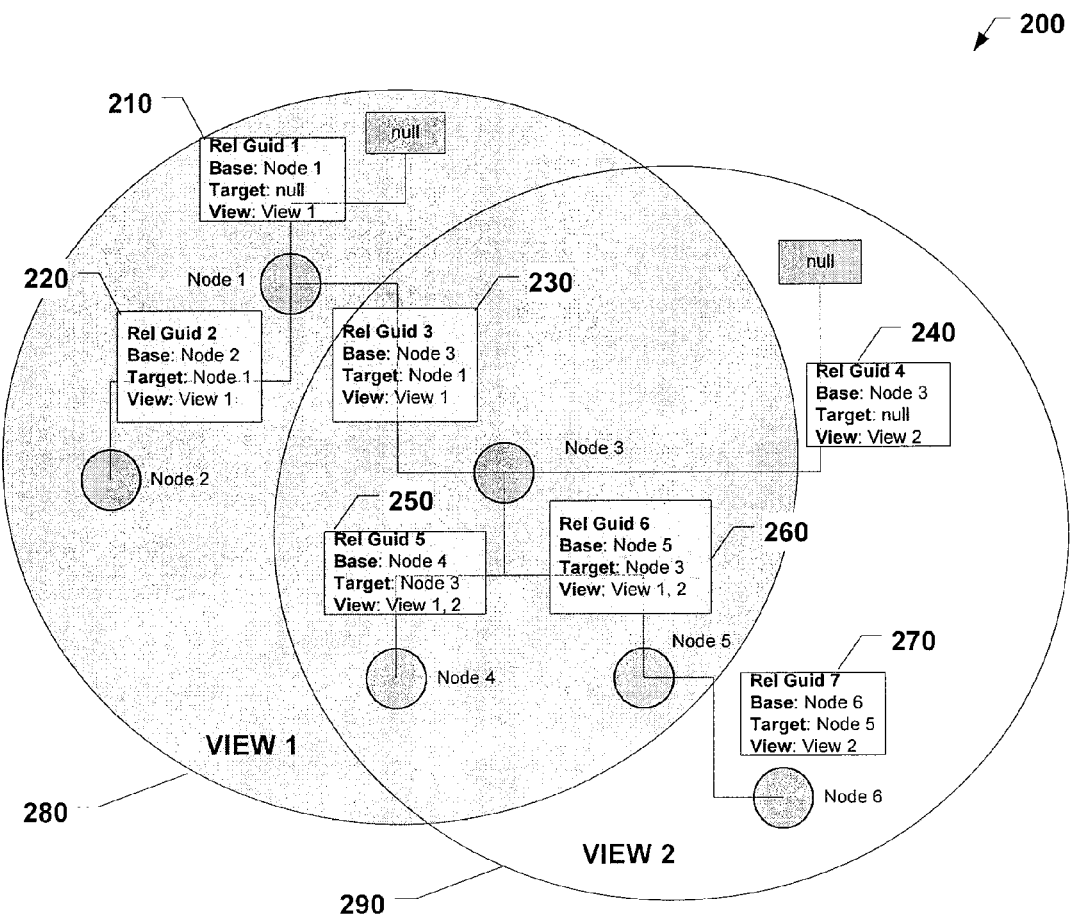
FIG. 2 is a block diagram of an exemplary table-of-contents TOC (or object relational tree) data structure corresponding to one or more embodiments of the present invention.

FIG. 2 shows a TOC tree structure 200 which is representative of one or analogous structures within memory 122. Tree structure 200 includes nodes 1-6 and is defined by several TOC data structures 210-270. Each of the TOC data structures includes a relationship guid portion (Rel Guid), a base or child guid portion (Base), a target or parent guid (Target) portion, and a view tag portion (View). As shown, the view tags portions define two views of the TOC, a view 280 (view 1) and a view 290 (view 2). The TOC tree (in blue) is defined by the relationships (in yellow). A node exists in a given view if there is a relationship in that given view with that particular node as a base or child node. In the example, Node 3 is in view 280 and view 290 because there is a relationship from Node 3 to Node 1 for View 1 and a relationship from Node 3 to NULL for View 2. Node 3 has a relationship to NULL in View 2 because Node 3 is a root node in View 2.

Figure 3:
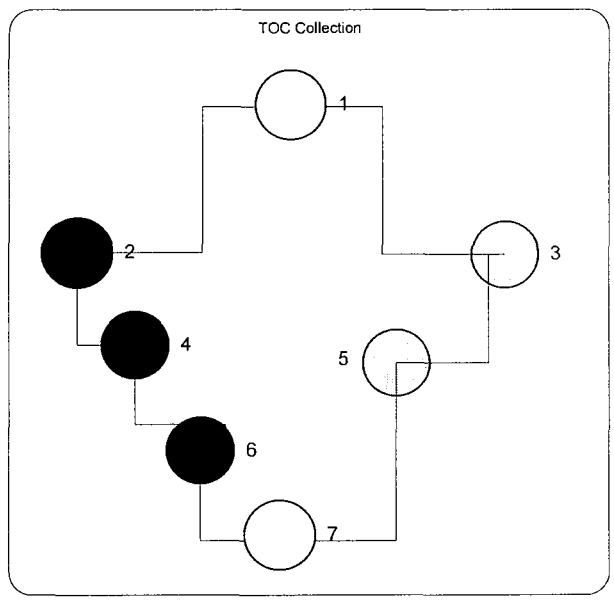
FIG. 3 is a block diagram of an exemplary table-of-contents TOC (or object relational tree) data structure corresponding to one or more embodiments of the present invention.
Figure 3:
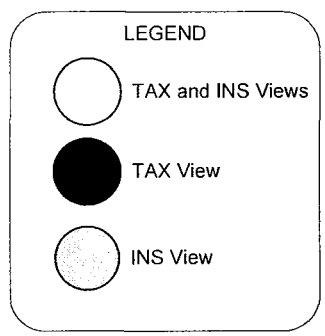

FIG. 3 shows a TOC tree structure 300 which is representative of one or analogous data structures within memory 122. Tree structure 300 includes nodes 1-7 which are associated with view tags. The figure depicts the view tag association by color coding the nodes: nodes 1 and 7 are white to denote a joint TAX and INS (insurance) view tag for these nodes; nodes 2, 4, 6 are black to denote a TAX view; and nodes 3 and 5 are gray to denote an INS view. In this example, one could navigate to node 7 from either the TAX or INS (insurance) views. From the data model, node 7 has multiple parents, but given a view it has unique ancestors.

Additionally, TOC software and data module 125 includes instruction sets for supporting navigational features, such as get root node, get parent and child nodes, retrieve nodes that reference a document, get next and previous document. Additionally, the exemplary embodiment provides a function for returning the nodes from a search result. The exemplary embodiment also provides for versioning of TOCs through the elements <n-start-date> and <n-end-date>, and the search function accepts a timestamp value that is honored during TOC retrieval. Only nodes whose date range encompasses the timestamp of the request will be returned.

The exemplary embodiment also provides TOC with Hits using search summarization to improve online performance for display of the hierarchy with hit counts associated with each node, that is non-terminal node. In some embodiments content owners set up an <n-tocview> element in the document metadata as the summarized content. However, the exemplary embodiment allows any element name to be used for summarization. In addition, the searchable content and summarized content need not be in a document at all—it can be in the payload itself. For TOC with Hits, some embodiments use whatever summarized information is in the search result to determine the hit counts for the TOC nodes.

User-interface module 126, in FIG. 1, includes machine readable and/or executable instruction sets for wholly or partly defining web-based user interfaces, such as search interface 1261 and results interface 1262, over a wireless or wireline communications network on one or more accesses devices, such as access device 130.

Exemplary Access Devices

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B. Search-results region 1382 is also defined in memory and upon rendering on the display presents results in a list view 1382 and/or in a hierarchical view 1382B. List view 1382A includes a list of documents from databases 110, including doc1 and doc2, identified by server 120 in response to a query. Hierarchical view 1382B presents a table of contents, highlighting the corresponding lowest nodes associated with documents doc1 and doc2, in this case respective nodes 1382C and 1382D. In the exemplary embodiment, the nodes are determined by searching TOC data structure in server 120 for those relationships (or nodes) that are associated with document guids corresponding to docs 1 and 2.

Figure 4:
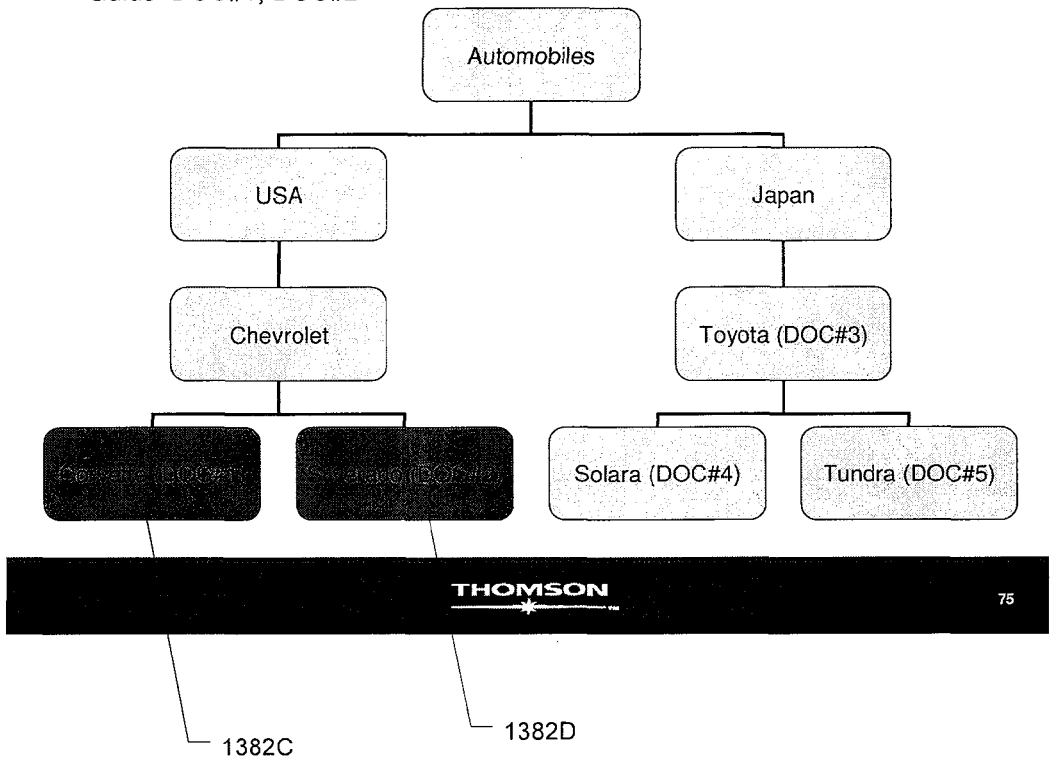
FIG. 4 is a block diagram of an exemplary graphical user interface corresponding one or more embodiments of the present invention.

FIG. 4 shows an enlarged version of hierarchical view or interface window 1382B. A user can select (for example by clicking) any node shown in the hierarchical view and navigate into the portion of the document collection corresponding that node. Additionally, some embodiments provide a count of documents associated with each displayed node of the hierarchy. One benefit of the hierarchical display is that the user can gain sense of how targeted or focused the query was relative to the contents of topical collection. For example, if the search result yield hits dispersed over a wide variety of nodes in the hierarchy, the query may have been too broad. On the other hand, if the results are concentrated in a specific area of the hierarchy, it may have been too narrow or just right.

Some embodiments may even provide a "zoom" capability to allow the user to zoom into a more granular view of the hierarchy or zoom out for less granular view. These and/or other embodiments may also provide control features such as a date entry box or a timeline slide (analogous to a scroll feature) that allows a user to filter the displayed hierarchical view based on time, by entering the time or sliding a button along a scale. Still, other embodiments present buttons with corresponding temporal labels to allow a user to simply select the time period which is of interest. This feature would be particularly effective for time view of organizational chart data, for example.

Back in FIG. 1, each identified document in region 1382 is associated with one or more interactive control features, such as hyperlinks, not shown here. User selection of one or more of these control features results in retrieval and display of at least a portion of the corresponding document within a region of interface 138 (not shown in this figure.) Although the Figure shows query region 1381 and results region 1382 as being simultaneously displayed, some embodiments present them at separate times. Similarly, the list view and hierarchical view may viewed simultaneously or separately.

CONCLUSION

The embodiments described above and in the claims are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A method of relating documents, the method comprising:
providing in a memory a first table-of-contents (TOC) data structure that includes a plurality of parent nodes and a plurality of child nodes, each child node being associated with one parent node to define a parent-child node pair for each combination of each child node and one parent node, and each child node further being associated with a document identifier that uniquely identifies a document in a document collection;
defining in the memory a second TOC data structure that includes a plurality of relationship records, each relationship record including a parent-child node pair of the first TOC data structure and a unique identifier that uniquely identifies a relationship of the parent-child node pair of the first TOC data structure; and
associating a rank indicator with each unique identifier in the second TOC data structure that indicates an order of each child node in the child-node pair of the first TOC data structure in relation to a sibling child node in another child-node pair in the first TOC data structure.

2. The method of claim 1, further comprising:
associating at least one of a first view label and a second view label with each unique identifier.

3. The method of claim 1, further comprising:
associating a time range with each unique identifier in the second TOC data structure that uniquely identifies each parent-child node pair in the first TOC data structure.

4. The method of claim 3, further comprising:
in response to identification of a time, displaying a hierarchical view of a portion of the first TOC data structure as part of a graphical user interface, wherein the displayed portion excludes a relationship record of a parent-child node pair that has a unique identifier in the second TOC data structure associated with the time range that does not encompass the time.

5. The method of claim 2, further comprising:
in response to identification of the first view label, displaying a hierarchical view of a portion of the first TOC data structure as part of a graphical user interface, wherein the displayed portion excludes a relationship record of a parent-child node pair that has a unique identifier in the second TOC data structure that is not tagged with the first view label.

6. The method of claim 1, further comprising:
based on identified documents in the document collection, displaying a hierarchical view of a portion of the first TOC data structure as part of a graphical user interface, wherein the displayed portion orders child nodes in the child-node pair of the first TOC data structure relating to the identified documents according to their rank indicators.

7. The method of claim 1, further comprising including the second TOC data structure in the first TOC data structure.

8. A server to relate documents, the server comprising:
a memory configured to store a first table-of-contents (TOC) data structure that includes a plurality of parent nodes and a plurality of child nodes, each child node being associated with one parent node to define a parent-child node pair for each combination of each child node and one parent node, and each child node further being associated with a document identifier that uniquely identifies a document in a document collection;
processor connected to the memory, the processor configured to define in the memory a second TOC data structure that includes a plurality of relationship records, each relationship record including a parent-child node pair of the first TOC data structure and a unique identifier that uniquely identifies a relationship of the parent-child node pair of the first TOC data structure; and
associate a rank indicator with each unique identifier in the second TOC data structure that indicates an order of each child node in the child-node pair of the first TOC data structure in relation to a sibling child node in another child-node pair in the first TOC data structure.

9. The server of claim 8, wherein the server is further configured to:
associate at least one of a first view label and a second view label with each unique identifier.

10. The server of claim 9, wherein in response to identification of the first view label the server is configured to:

display a hierarchical view of a portion of the first TOC data structure as part of a graphical user interface, wherein the displayed portion excludes a relationship record of a parent-child node pair that has a unique identifier in the second TOC data structure that is not tagged with the first view label.

11. The server of claim 8, wherein the server is configured to:

associate a time range with each unique identifier in the second TOC data structure that uniquely identifies each parent-child node pair in the first TOC data structure.

12. The server of claim 11, wherein in response to identification of a time the server is configured to:

display a hierarchical view of a portion of the first TOC data structure as part of a graphical user interface, wherein the displayed portion excludes a relationship record of a parent-child node pair that has a unique identifier in the second TOC data structure associated with the time range that does not encompass the time.

13. The server of claim 8, wherein based on identified documents in the document collection the server is configured to:

display a hierarchical view of a portion of the first TOC data structure as part of a graphical user interface, wherein the displayed portion orders child nodes in the child-node pair of the first TOC data structure relating to the identified documents according to their rank indicators.

14. The server of claim 8, wherein the server is configured to:

record the second TOC data structure in the first TOC data structure.

15. Non-transitory computer readable media comprising program code stored thereon for execution by a programmable processor to perform a method of relating documents, the computer readable media comprising:

program code for providing in a memory a first table-of-contents (TOC) data structure that includes a plurality of parent nodes and a plurality of child nodes, each child node being associated with one parent node to define a parent-child node pair for each combination of each child node and one parent node, and each child node further being associated with a document identifier that uniquely identifies a document in a document collection;

program code for defining in the memory a second TOC data structure that includes a plurality of relationship records, each relationship record including a parent-child node pair of the first TOC data structure and a unique identifier that uniquely identifies a relationship of the parent-child node pair of the first TOC data structure; and program code for associating a rank indicator with each unique identifier in the second TOC data structure that indicates an order of each child node in the child-node pair of the first TOC data structure in relation to a sibling child node in another child-node pair in the first TOC data structure.

16. The computer readable media of claim 15 further comprising program code for associating at least one of a first view label and a second view label with each unique identifier.

17. The computer readable media of claim 15 further comprising program code for associating a time range with each unique identifier in the second TOC data structure that uniquely identifies each parent-child node pair in the first TOC data structure.

18. The computer readable media of claim 17, in response to identification of a time, further comprising program code for displaying a hierarchical view of a portion of the first TOC data structure as part of a graphical user interface, wherein the displayed portion excludes a relationship record of a parent-child node pair that has a unique identifier in the second TOC data structure associated with the time range that does not encompass the time.

19. The computer readable media of claim 16, in response to identification of the first view label, further comprising program code for displaying a hierarchical view of a portion of the first TOC data structure as part of a graphical user interface, wherein the displayed portion excludes a relationship record of a parent-child node pair that has a unique identifier in the second TOC data structure that is not tagged with the first view label.

20. The computer readable media of claim 15, based on identified documents in the document collection, further comprising program code for displaying a hierarchical view of a portion of the first TOC data structure as part of a graphical user interface, wherein the displayed portion orders child nodes in the child-node pair of the first TOC data structure relating to the identified documents according to their rank indicators.

* * * * *